(12) United States Patent
Dipietro et al.

(10) Patent No.: US 12,043,745 B2
(45) Date of Patent: Jul. 23, 2024

(54) HYBRID PIGMENTS AND METHODS OF MAKING SAME

(71) Applicant: DAY-GLO COLOR CORP., Cleveland, OH (US)

(72) Inventors: Thomas Dipietro, Medina, OH (US); Liming Tang, Twinsburg, OH (US); Christopher Newbacher, Strongsville, OH (US)

(73) Assignee: DAY-GLO COLOR CORP., Cleveland, OH (US)

( * ) Notice: Subject to any disclaimer, the term of this patent is extended or adjusted under 35 U.S.C. 154(b) by 138 days.

(21) Appl. No.: 17/837,452

(22) Filed: Jun. 10, 2022

(65) Prior Publication Data

US 2022/0396701 A1 Dec. 15, 2022

Related U.S. Application Data

(60) Provisional application No. 63/209,732, filed on Jun. 11, 2021.

(51) Int. Cl.
| | | |
|---|---|---|
| *C09B 69/00* | (2006.01) | |
| *C09B 67/04* | (2006.01) | |
| *C09B 67/06* | (2006.01) | |
| *C09B 67/20* | (2006.01) | |
| *C09B 69/02* | (2006.01) | |

(52) U.S. Cl.
CPC .......... *C09B 69/02* (2013.01); *C09B 67/0002* (2013.01); *C09B 67/0003* (2013.01); *C09B 67/0066* (2013.01)

(58) Field of Classification Search
CPC . C09B 69/02; C09B 67/0002; C09B 67/0003; C09B 67/0066; C09B 68/4253; C09B 68/4257
USPC .............................................. 8/552
See application file for complete search history.

(56) References Cited

U.S. PATENT DOCUMENTS

2007/0251028 A1 11/2007 Samain et al.
2021/0380811 A1* 12/2021 Ootsubo .............. C09D 11/322

FOREIGN PATENT DOCUMENTS

| EP | 1854448 A2 * | 11/2007 | ............... A61Q 5/00 |
| WO | WO 9743353 A1 * | 11/1997 | ............. C09K 11/06 |
| WO | WO 9938916 A1 * | 8/1999 | ......... C09B 67/0061 |
| WO | 2012093027 A1 | 7/2012 | |
| WO | 2020067140 A1 | 4/2020 | |

OTHER PUBLICATIONS

International Search Report and Written Opinion from PCT/US2022/033010 dated Sep. 15, 2022.

* cited by examiner

*Primary Examiner* — Eisa B Elhilo
(74) *Attorney, Agent, or Firm* — Calfee, Halter & Griswold LLP

(57) ABSTRACT

Provided herein are hybrid pigments and methods of making the same. The hybrid pigments include a natural polyamide substrate and an acid dye disposed on the natural polyamide substrate. The hybrid pigments are biodegradable, compostable, or both, and provide an environmentally friendly alternative to synthetic polymer particle-based pigments.

27 Claims, No Drawings

HYBRID PIGMENTS AND METHODS OF MAKING SAME

CROSS-REFERENCE TO RELATED APPLICATIONS

This application claims priority to and the benefit of U.S. Provisional Patent Application No. 63/209,732, filed Jun. 11, 2021, the entire content of which is incorporated by reference herein.

FIELD

The present disclosure generally relates to pigments. More particularly, the present disclosure relates to hybrid pigments that include a natural polyamide substrate and an acid dye disposed on the natural polyamide substrate and methods of making the hybrid pigment.

BACKGROUND

Conventional fluorescent pigments used as colorants for a variety of products and applications comprise synthetic polymer particles that incorporate or carry a dye material. A typical process for making such pigments includes: i) dissolving a dye in a molten polymer; ii) cooling the polymer-dye mixture to form a solid; and iii) milling the solid to a desired particle size, thereby forming the pigment.

The synthetic polymer particles of conventional fluorescent pigments have a limited ability to biodegrade. When such fluorescent pigments are used in products such as cosmetics, inks, paints, fire retardants, or seed coatings, the synthetic polymer particles may find their way into the environment. As a result of their limited ability to biodegrade, synthetic polymer particles from fluorescent pigments can accumulate in the environment over time.

Accordingly, there is a need in the art for pigment compositions that function as well as synthetic polymer particle-based fluorescent pigments, yet do not accumulate in the environment.

SUMMARY

Disclosed herein are hybrid pigments that include a natural polyamide substrate and an acid dye disposed on the natural polyamide substrate, as well as methods of making the hybrid pigments. The hybrid pigments of the present disclosure provide an environmentally friendly alternative to synthetic polymer particle-based pigments.

In accordance with the present disclosure, a hybrid pigment is provided. The hybrid pigment includes a natural polyamide substrate and an acid dye disposed on the natural polyamide substrate. In certain aspects of the present disclosure, the natural polyamide substrate includes at least one of a plant-derived protein and an animal-derived protein. In certain aspects of the present disclosure, the acid dye is ionically bonded to the natural polyamide substrate.

In accordance with the present disclosure, a method of making a hybrid pigment is provided. The method includes: a) preparing a suspension comprising water and a natural polyamide substrate; b) heating the suspension with agitation; c) adding with agitation an acid dye to the suspension; d) separating solids from the suspension to form a wet cake; e) drying the wet cake to form a dry cake; and f) comminuting the dry cake to form the hybrid pigment.

The hybrid pigments of the present disclosure may be used in a variety of products. In certain aspects, a cosmetic product comprises a hybrid pigment of the present disclosure. In certain aspects, a fire-retardant material comprises a hybrid pigment of the present disclosure. In certain aspects, a seed coating formulation comprises a hybrid pigment of the present disclosure. In certain aspects, a paint or coating comprises a hybrid pigment of the present disclosure. In certain aspects, a masterbatch colorant comprises a hybrid pigment of the present disclosure. In certain aspects, an ink or ink base for conventional offset, rotogravure, flexographic, screen, or digital printing comprises a hybrid pigment of the present disclosure.

Other aspects of the present disclosure will be apparent from the detailed description that follows.

DETAILED DESCRIPTION

Disclosed herein are hybrid pigments and methods of making hybrid pigments. In accordance with the present disclosure, the hybrid pigments comprise a natural polyamide substrate and an acid dye disposed on the natural polyamide substrate. While the present disclosure describes certain embodiments of the hybrid pigments and associated methods of making a hybrid pigment in detail, the present disclosure is to be considered exemplary and is not intended to be limited to the disclosed embodiments. Also, certain elements or features of embodiments disclosed herein are not limited to a particular embodiment, but instead apply to all embodiments of the present disclosure.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Furthermore, when the phrase "one or more of A and B" is employed it is intended to mean "only A, only B, or both A and B." Similarly, when the phrases "at least one of A, B, and C" or "at least one of A, B, C, and combinations thereof" are employed, they are intended to mean "only A, only B, only C, or any combination of A, B, and C" (e.g., A and B; B and C; A and C; A, B, and C).

The hybrid pigments and associated methods of the present disclosure may comprise, consist of, or consist essentially of the essential elements of the hybrid pigments and methods as described herein, as well as any additional or optional element or feature described herein or which is otherwise useful in pigment applications.

Ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

Any combination of method or process steps as used herein may be performed in any order, unless otherwise specified or clearly implied to the contrary by the context in which the referenced combination is made.

The pigments of the present disclosure are referred to as "hybrid" in that they comprise a natural polyamide substrate and a synthetic acid dye. Unlike synthetic polymer particle-based pigments, the hybrid pigments of the present disclosure are biodegradable, compostable, or both because the hybrid pigments are primarily comprised of a natural polyamide material. Moreover, the use of acid dyes provides the hybrid pigments of the present disclosure with superior color quality, light stability, pH stability, and thermal stability that enable the hybrid pigments to be used in a variety of products. Accordingly, the hybrid pigments disclosed herein provide an environmentally friendly alternative to synthetic polymer particle-based pigments.

In general, the hybrid pigments of the present disclosure are in the form of a powder or particulate material. In certain aspects, the hybrid pigments of the present disclosure have an average particle size of less than 30 μm, including an average particle size of 1 μm to 30 μm, an average particle size of 1 μm to 25 μm, an average particle size of 1 μm to 20 μm, an average particle size of 1 μm to 15 μm, an average particle size of 1 μm to 10 μm, and also including an average particle size of 1 μm to 5 μm. The average particle size disclosed herein is determined using a HORIBA LA-960 laser scattering particle size distribution analyzer. In addition, the hybrid pigments of the present disclosure are generally water insoluble and chemically inert, which allows the hybrid pigments to be used in a variety of applications and products. In certain aspects of the present disclosure, the hybrid pigments are fluorescent pigments.

Natural Polyamide Substrate

The hybrid pigments of the present disclosure comprise a natural polyamide substrate. In certain aspects, the hybrid pigment comprises 90% to 99% by weight natural polyamide substrate (based on the total weight of the hybrid pigment), including 92% to 99% by weight natural polyamide substrate, 94% to 99% by weight natural polyamide substrate, and also including from 96% to 99% by weight natural polyamide substrate. Because the hybrid pigments of the present disclosure predominantly comprise a natural polyamide substrate material (i.e., greater than 90% by weight), the hybrid pigments are biodegradable, compostable, or both.

In accordance with the present disclosure, the natural polyamide substrate includes a protein or a protein source. When used to make the hybrid pigments of the present disclosure, the natural polyamide substrate may be provided in powder form or in liquid form. In certain aspects, the natural polyamide substrate comprises at least one of a plant-derived protein and an animal-derived protein. In certain aspects, the natural polyamide substrate comprises both a plant-derived protein and an animal-derived protein. The protein or protein source utilized as the natural polyamide substrate may be intact protein (i.e., non-hydrolyzed protein), hydrolyzed protein, or a combination of both intact protein and hydrolyzed protein.

The term "plant-derived protein," as used herein, includes any protein that is derived from plant material, which plant material may include, but is not limited to, cereals (e.g., rice, wheat), pseudocereals (e.g., quinoa), legumes (e.g., peas, beans, soybeans), seed materials (e.g., hemp, rapeseed), and so forth. Examples of suitable plant-derived protein that may be used as the natural polyamide substrate of the present disclosure include, but are not limited to, rice protein, hydrolyzed rice protein, soy protein, hydrolyzed soy protein, defatted soy flour, pea protein, hydrolyzed pea protein, wheat protein, hydrolyzed wheat protein, fava bean protein, hydrolyzed fava bean protein, rapeseed protein, hydrolyzed rapeseed protein, hemp protein, hydrolyzed hemp protein, quinoa protein, and hydrolyzed quinoa protein. One example of a suitable commercially available plant-derived protein for use as the natural polyamide substrate of the present disclosure is Oryzatein™ 80 brown rice protein from Axiom Foods, Inc. (Los Angeles, California).

The term "animal-derived protein," as used herein, includes any protein that is derived from an animal. The animal-derived protein may be derived from sources including, but not limited to, an animal's milk (e.g., milk protein, whey protein, casein protein), an animal's egg, byproducts of animal processing (e.g., fish meal, feather meal, collagen protein), and so forth. Examples of suitable animal-derived protein that may be used as the natural polyamide substrate of the present disclosure include, but are not limited to, whey protein, hydrolyzed whey protein, milk protein isolate, casein protein, hydrolyzed casein protein, egg protein, hydrolyzed egg protein, collagen protein, hydrolyzed collagen protein, keratin, feather meal, and fish meal.

Acid Dye

The hybrid pigments of the present disclosure include an acid dye. Acid dyes are anionic, water soluble, organic compounds whose molecules include at least one acidic group (e.g., $-SO_3H$, $-COOH$) and a color-producing group. Typically, acid dyes are provided for use in powder form. The term "acid dye," as used herein, encompasses the free acid form and salt forms (e.g., sodium salt, calcium salt, potassium salt) of the acid dye.

In accordance with the present disclosure, the acid dye is disposed on the natural polyamide substrate to form the hybrid pigment. In certain aspects, the acid dye is ionically bonded to the natural polyamide substrate. In certain aspects, the hybrid pigment comprises 1% to 10% by weight acid dye (based on the total weight of the hybrid pigment), including 1% to 8% by weight acid dye, 1% to 6% by weight acid dye, and also including from 1% to 4% by weight acid dye.

A single acid dye or a combination of two or more different acid dyes may be used to achieve a hybrid pigment having a desired color. Examples of suitable acid dyes for use in the hybrid pigments of the present disclosure include, but are not limited to, Acid Yellow 23, Acid Yellow 3, Acid Yellow 73, Acid Yellow 250, Acid Red 50, Acid Red 52, Acid Red 87, Acid Red 92, Acid Blue 9, Acid Blue 25, Acid Blue 45, Acid Red 73, Acid Green 25, Acid Violet 14, Acid Violet 43, D&C Red 40 (Food Red 17), and FD&C Green 3. In certain aspects, the acid dye is a fluorescent acid dye. Exemplary fluorescent acid dyes include, but are not limited to, Acid Yellow 73, Acid Yellow 250, Acid Red 50, Acid Red 52, Acid Red 87, and Acid Red 92. Accordingly, in certain aspects, the acid dyes used to make the hybrid pigments of the present disclosure are those used to make conventional fluorescent pigments.

Method of Making a Hybrid Pigment

The hybrid pigments of the present disclosure may be made using a dye bath technique. In accordance with the present disclosure, a method of making a hybrid pigment includes: a) preparing a suspension comprising water and a natural polyamide substrate; b) heating the suspension with agitation; c) adding with agitation an acid dye to the suspension; d) separating solids from the suspension to form a wet cake; e) drying the wet cake to form a dry cake; and f) comminuting the dry cake to form the hybrid pigment. Any one or more of the previously described natural polyamide substrate materials (i.e., plant-derived protein, animal-derived protein) and any one or more of the previously described acid dyes can be used to make a hybrid pigment of the present disclosure. The method of making a hybrid pigment may be carried out using conventional processing equipment known to those of ordinary skill in the art. For example, steps a) to c) may be performed in a reactor vessel equipped with an agitator and an integral heating/cooling system, a fluidized bed, an extruder, or any other suitable means capable of circulating solids (e.g., natural polyamide substrate) in a liquid bath and heating the mixture.

In certain aspects of the method of the present disclosure, one or more processing aids are added to the suspension. Exemplary processing aids include, but are not limited to defoamers, surfactants, dispersants, stabilizers, flocculants, and the like. In certain aspects, the suspension further comprises at least one of a defoamer, a surfactant, a dispersant, and a stabilizer. Exemplary defoamers suitable for use in the methods of the present disclosure include, but are not limited to, Surfynol™ DF-37 defoamer, which is an acetylenic-based, alkylphenol ethoxylate (APE) free, non-ionic organic defoamer commercially available from Evonik Industries (Essen, Germany) and Dee Fo™ 806-102E defoamer, which is a non-ionic defoamer commercially available from Munzing Chemie GmbH (Abstatt, Germany). Exemplary surfactants suitable for use in the methods of the present disclosure include, but are not limited to, cocamidopropyl betaine, which is commercially available as Caltaine™ C-35 from Pilot Chemical Company (Cincinnati, Ohio) and hexadecyltrimethylammonium chloride, which is commercially available as Arquad™ 16-29 from Nouryon Chemicals (Amsterdam, Netherlands). An exemplary dispersant suitable for use in the methods of the present disclosure includes, but is not limited to, potassium tripolyphosphate. An exemplary stabilizer (or thickener) suitable for use in the methods of the present disclosure includes, but is not limited to, a carbomer, such as a Carbopol™ polymer available from The Lubrizol Corporation (Wickliffe, Ohio).

In certain aspects, the method of the present disclosure further comprises adding with agitation a flocculant to the suspension. In certain aspects, the flocculant is added with agitation to the suspension after adding the acid dye. The use of a flocculant enhances the ability to separate solids from the suspension when carrying out the method of the present disclosure. Any suitable flocculant may be used in the method of the present disclosure. Exemplary flocculants suitable for use in the methods of the present disclosure include, but are not limited to, aluminum sulfate, zinc sulfate, polyaluminum chloride, polyaluminum hydroxychloride, aluminum chloride, aluminum chlorohydrate, ferric chloride, ferrous sulfate monohydrate, or combinations thereof.

In certain aspects, the method of the present disclosure includes adjusting a pH of the suspension to a pH of 2.5 to 6.5 to form an acidic suspension prior to adding the acid dye. In certain aspects, the pH of the suspension is adjusted to a pH of 2.5 to 4.5 prior to adding the acid dye. Any suitable acid may be used to adjust the pH of the suspension. Exemplary acids suitable for adjusting the pH of the suspension include, but are not limited to, phosphoric acid, sulfuric acid, citric acid, hydrochloric acid, formic acid, nitric acid, acetic acid, and solutions thereof. Addition of acid to the suspension promotes generation of a cationic charge on the natural polyamide substrate via protonation of amine groups and, along with the application of heat, promotes the exchange of the negatively charged conjugate base derived from the acid with an anionic acid dye molecule. An ionic bond can be established between protonated amine groups of the natural polyamide substrate and the anionic groups of the acid dye, and thereby color the natural polyamide substrate.

In certain aspects, the method of the present disclosure may include treating or modifying the natural polyamide substrate. Treatments or modifications of the natural polyamide substrate may include, but are not limited to, bleaching, denaturing, removing at least a portion of soluble fractions from the natural polyamide substrate, and combinations thereof. The treatments or modifications of the natural polyamide substrate may be performed on the suspension prior to adding the acid dye.

In certain aspects, the method of the present disclosure includes bleaching the natural polyamide substrate by adding a bleaching agent to the suspension prior to adding the acid dye. Bleaching may be desirable for enhancing the color of the hybrid pigment, as certain natural polyamide substrate materials (e.g., rice protein) may have an off-white or brownish color. Exemplary bleaching agents suitable for use in the methods of the present disclosure include, but are not limited to, hydrogen peroxide, sodium percarbonate, sodium hypochlorite, and solutions thereof. In addition, the bleaching agent may be formed in situ by a chemical reaction, such as a reaction between hydrogen peroxide and sodium hydroxide that forms sodium peroxide. In certain aspects, the natural polyamide substrate is subjected to a bleaching treatment prior to its use in the method of the present disclosure.

In certain aspects, the method of the present disclosure includes denaturing the natural polyamide substrate. Acid dyes provide excellent color quality when used in association with amorphous, non-crystalline polymers. Denaturing the natural polyamide substrate can lead to improvements in the color quality of the hybrid pigment by disrupting the crystalline structure of the natural polyamide substrate. The natural polyamide substrate may be denatured by adding a denaturing agent to the suspension prior to adding the acid dye. Exemplary denaturing agents suitable for use in the methods of the present disclosure include, but are not limited to, organic solvents (e.g., ethyl alcohol, acetonitrile) urea, amines, salts (e.g., sodium chloride), surfactants, detergents, alkaline aqueous solutions (e.g., sodium hydroxide solution), and acidic aqueous solutions.

In certain aspects, the method of the present disclosure includes treating the suspension to remove at least a portion of soluble (i.e., water-soluble and/or salt-soluble) fractions from the natural polyamide substrate. It was determined that the soluble fractions from the natural polyamide substrate were functioning as an adhesive that caused the solids to stick together upon drying, which hindered the ability to reduce the particle size of the solids and form the hybrid pigment. Removing at least a portion of the soluble fractions alleviated the problem of the solids sticking together when subjected to drying. Removal of at least a portion of the soluble fractions from (or partial dissolution of) the natural polyamide substrate may be accomplished by adding to the suspension (prior to adding the acid dye) sodium chloride, potassium chloride, monobasic sodium phosphate, and solutions thereof.

As previously mentioned, the method of the present disclosure includes heating the suspension with agitation. The method of the present disclosure includes at least one heating step and, in certain aspects, includes multiple (e.g., two, three) heating steps. In certain aspects, the method of the present disclosure includes heating the suspension with agitation to a temperature of up to no more than 100° C., including a temperature of up to no more than 90° C., including a temperature of up to no more than 60° C., including a temperature of 70° C. to 100° C., including a temperature of 75° C. to 95° C., including a temperature of 80° C. to 90° C. and also including a temperature of 45° C. to 60° C. In certain aspects, the suspension is heated with agitation prior to adding the acid dye to the suspension. In certain aspects, the suspension is heated with agitation after adding the acid dye to the suspension. In certain aspects, the suspension is heated with agitation prior to adding the acid dye and is heated with agitation after adding the acid dye.

The method of the present disclosure includes a step of separating solids from the suspension to form a wet cake. Any known process and/or processing equipment for separating solids from a suspension may be used in the method of the present disclosure. In certain aspects, the method of the present disclosure uses a centrifuge process to separate solids from the suspension and thereby form a wet cake. In certain aspects, the method of the present disclosure uses a filter press process to separate solids from the suspension and thereby form a wet cake. In certain aspects, the method of the present disclosure uses vacuum filtration to separate solids from the suspension and thereby form a wet cake.

After forming the wet cake, the next step of the method of the present disclosure includes drying the wet cake to form a dry cake. Drying the wet cake may be performed in a conventional oven or similar equipment at a temperature (e.g., 115° C. to 130° C.) and for a time period sufficient to remove substantially all (e.g., greater than 95%) of the water from the wet cake to thereby form the dry cake. Although the phrase "dry cake" is used, it should be understood that the dry cake may include some residual amount of moisture such as, for example, no more than 5% by weight water (based on the total weight of the dry cake), including no more than 3% by weight water, no more than 2% by weight water, no more than 1% by weight water, and also including no more than 0.5% by weight water.

After the dry cake is formed, the method of the present disclosure includes comminuting the dry cake to form the hybrid pigment. The step of comminuting may include subjecting the dry cake to one or more processes capable of reducing the particle size of the dry cake and, thus, the hybrid pigment. In certain aspects, the dry cake is comminuted by at least one of milling, grinding, crushing, or similar processes.

In certain aspects, the method of making a hybrid pigment includes: a) preparing a suspension comprising water and a natural polyamide substrate; b) treating the suspension to remove at least a portion of soluble fractions from the natural polyamide substrate; c) heating the suspension with agitation to a temperature of up to no more than 100° C. (e.g., 45° C. to 60° C.); d) adjusting a pH of the suspension to a pH of 7.5 to 10 to form a basic suspension (and neutralize one or more acidic components present, such as a carbomer); e) heating the basic suspension with agitation to a temperature of 70° C. to 100° C.; f) adjusting a pH of the basic suspension to a pH of 2.5 to 6.5 to form an acidic suspension; g) adding with agitation an acid dye to the acidic suspension; d) separating solids from the suspension to form a wet cake; e) drying the wet cake to form a dry cake; and f) comminuting the dry cake to form the hybrid pigment.

Hybrid Pigment Applications

The hybrid pigments of the present disclosure may be used in a variety of applications and products. Indeed, the hybrid pigments of the present disclosure may be used in any application or product that uses any type of pigment, including conventional fluorescent pigments, inorganic pigments, and lake pigments. Use of the hybrid pigments of the present disclosure is advantageous in that the hybrid pigments are biodegradable, compostable, or both. Non-limiting examples of products or applications that can utilize a hybrid pigment of the present disclosure are provided below.

In one example, a cosmetic product comprises a hybrid pigment of the present disclosure. Exemplary cosmetic products include, but are not limited to, lip stick, lip gloss, blush, eye shadow, face powder, mascara, foundation, hair dyes and treatments, and the like.

In one example, a fire-retardant material comprises a hybrid pigment of the present disclosure. In particular, the fire-retardant material may be an aerial fire-retardant material, which includes a coloring agent so that air crews can identify areas where the fire-retardant material has been dropped. The hybrid pigment of the present disclosure can be used to replace conventional coloring agents used in fire-retardant material formulations.

In one example, a seed coating formulation comprises a hybrid pigment of the present disclosure. Seeds used for agricultural purposes are often covered with exogenous materials primarily to improve handling and protection of the seed. Seed coating materials may also include a coloring agent for identification or differentiation purposes. Accordingly, the hybrid pigment of the present disclosure can be used in seed coating formulations as a coloring agent.

In one example, a paint or coating comprises a hybrid pigment of the present disclosure. The hybrid pigment may be used as a replacement for conventional pigments used in paints and coatings, or as a supplement to conventional pigments used in paints and coatings.

In one example, a masterbatch colorant comprises a hybrid pigment of the present disclosure. The hybrid pigment may be used as a replacement for conventional pigments used in masterbatch colorants, or as a supplement to conventional pigments used in masterbatch colorants.

In one example, an ink or ink base comprises a hybrid pigment of the present disclosure. The ink or ink base comprising the hybrid pigment of the present disclosure may be used for conventional offset, rotogravure, flexographic, screen, or digital printing. The hybrid pigment may be used as a replacement for conventional pigments used in inks or ink bases, or as a supplement to conventional pigments used in inks or ink bases.

EXAMPLES

The following examples illustrate exemplary embodiments and/or features of the methods and hybrid pigments of the present disclosure. The examples are given solely for the purpose of illustration and are not to be construed as limitations of the present disclosure, as many variations thereof are possible without departing from the spirit and scope of the present disclosure.

Example 1

In this example, a hybrid pigment that includes rice protein and Acid Red 92 was prepared. A suspension was prepared by mixing together 4 g of defoamer (Surfynol™ DF-37 defoamer), 1 g of cocamidopropyl betaine surfactant (Caltaine™ C-35), 2 g of carbomer (Carbopol™ ETD 2691 polymer), 100 g of rice protein (Oryzatein™ 80) and 300 g of water. To this suspension was added 60 g of sodium chloride. Next, the suspension was heated to a temperature of 50° C. and then a solution of sodium hydroxide was added to adjust the pH to 8.5 (addition of the sodium hydroxide neutralizes the carbomer, thereby rendering the carbomer water-soluble). The temperature of the suspension was then raised to 80° C. and maintained for 2 hours. Arquad™ 16-29 and phosphoric acid solution was added to the suspension to adjust the pH to 4. Next, Acid Red 92 acid dye was added to the suspension and mixed for 10 minutes. The solids were removed from the suspension via vacuum filtration and the resulting wet cake was transferred to an oven at 120° C. to dry the wet cake. The resulting dry cake was milled to form the hybrid pigment.

Example 2

In this example, a hybrid pigment that includes rice protein and Acid Red 87 was prepared. A suspension was prepared by mixing together 4 g of defoamer (Surfynol™ DF-37 defoamer), 1 g of cocamidopropyl betaine surfactant (Caltaine™ C-35), 2 g of carbomer (Carbopol™ ETD 2691 polymer), 100 g of rice protein (Oryzatein™ 80) and 300 g of water. To this suspension was added 60 g of sodium chloride. Next, the suspension was heated to a temperature of 50° C. and then a solution of sodium hydroxide was added to adjust the pH to 8.5 (addition of the sodium hydroxide neutralizes the carbomer, thereby rendering the carbomer water-soluble). The temperature of the suspension was then raised to 80° C. and maintained for 2 hours. Arquad™ 16-29 and phosphoric acid solution was added to the suspension to adjust the pH to 4. Next, Acid Red 92 acid dye was added to the suspension and mixed for 10 minutes. Aluminum sulfate was then added to the suspension and mixed for an additional 10 minutes. The solids were removed from the suspension via vacuum filtration and the resulting wet cake was transferred to an oven at 120° C. to dry the wet cake. The resulting dry cake was milled to form the hybrid pigment.

Example 3

In this example, a hybrid pigment that includes rice protein and D&C Red 40 (Food Red 17) was prepared. A suspension was prepared by mixing together 4 g of defoamer (Dee Fo™ 806-102E defoamer), 1 g of cocamidopropyl betaine surfactant (Caltaine™ C-35), 2 g of carbomer (Carbopol™ ETD 2691 polymer), 100 g of rice protein (Oryzatein™ 80) and 300 g of water. To this suspension was added 60 g of sodium chloride. Next, the suspension was heated to a temperature of 50° C. and then a solution of sodium hydroxide was added to adjust the pH to 8.5 (addition of the sodium hydroxide neutralizes the carbomer, thereby rendering the carbomer water-soluble). The temperature of the suspension was then raised to 80° C. and maintained for 2 hours. Arquad™ 16-29 and phosphoric acid solution was added to the suspension to adjust the pH to 4. Next, D&C Red 40 (Food Red 17) acid dye was added to the suspension and mixed for 10 minutes. Aluminum sulfate was then added to the suspension and mixed for an additional 10 minutes. The solids were removed from the suspension via vacuum filtration and the resulting wet cake was transferred to an oven at 120° C. to dry the wet cake. The resulting dry cake was milled to form the hybrid pigment.

Example 4

In this example, a hybrid pigment that includes rice protein and FD&C Green 3 was prepared. A suspension was prepared by mixing together 4 g of defoamer (Surfynol™ DF-37 defoamer), 1 g of cocamidopropyl betaine surfactant (Caltaine™ C-35), 2 g of carbomer (Carbopol™ ETD 2691 polymer), 100 g of rice protein (Oryzatein™ 80) and 300 g of water. To this suspension was added 60 g of sodium chloride. Next, the suspension was heated to a temperature of 50° C. and then a solution of sodium hydroxide was added to adjust the pH to 8.5 (addition of the sodium hydroxide neutralizes the carbomer, thereby rendering the carbomer water-soluble). The temperature of the suspension was then raised to 80° C. and maintained for 2 hours. Arquad™ 16-29 and phosphoric acid solution was added to the suspension to adjust the pH to 4. Next, FD&C Green 3 acid dye was added to the suspension and mixed for 10 minutes. Aluminum sulfate was then added to the suspension and mixed for an additional 10 minutes. The solids were removed from the suspension via vacuum filtration and the resulting wet cake was transferred to an oven at 120° C. to dry the wet cake. The resulting dry cake was milled to form the hybrid pigment.

Example 5

In this example, a hybrid pigment that includes rice protein and Acid Blue 9 was prepared. A suspension was prepared by mixing together 4 g of defoamer (Dee Fo™ 806-102E defoamer), 1 g of cocamidopropyl betaine surfactant (Caltaine™ C-35), 2 g of carbomer (Carbopol™ ETD 2691 polymer), 100 g of rice protein (Oryzatein™ 80) and 300 g of water. To this suspension was added 60 g of sodium chloride. Next, the suspension was heated to a temperature of 50° C. and then a solution of sodium hydroxide was added to adjust the pH to 8.5 (addition of the sodium hydroxide neutralizes the carbomer, thereby rendering the carbomer water-soluble). The temperature of the suspension was then raised to 80° C. and maintained for 2 hours. Arquad™ 16-29 and phosphoric acid solution was added to the suspension to adjust the pH to 4. Next, Acid Blue 9 acid dye was added to the suspension and mixed for 10 minutes. Aluminum sulfate was then added to the suspension and mixed for an additional 10 minutes. The solids were removed from the suspension via vacuum filtration and the resulting wet cake was transferred to an oven at 120° C. to dry the wet cake. The resulting dry cake was milled to form the hybrid pigment.

Example 6

In this example, a hybrid pigment that includes rice protein and Acid Yellow 23 was prepared. A suspension was prepared by mixing together 4 g of defoamer (Surfynol™ DF-37 defoamer), 1 g of cocamidopropyl betaine surfactant (Caltaine™ C-35), 2 g of carbomer (Carbopol™ ETD 2691 polymer), 100 g of rice protein (Oryzatein™ 80) and 300 g of water. To this suspension was added 60 g of sodium chloride. Next, the suspension was heated to a temperature of 50° C. and then a solution of sodium hydroxide was added to adjust the pH to 8.5 (addition of the sodium hydroxide neutralizes the carbomer, thereby rendering the carbomer water-soluble). The temperature of the suspension was then raised to 80° C. and maintained for 2 hours. Next, hydrogen peroxide was added to the suspension and maintained at 80° C. for 2 hours. Arquad™ 16-29 and phosphoric acid solution was added to the suspension to adjust the pH to 4. Next, Acid Yellow 23 acid dye was added to the suspension and mixed for 10 minutes. Aluminum sulfate was then added to the suspension and mixed for an additional 10 minutes. The solids were removed from the suspension via vacuum filtration and the resulting wet cake was transferred to an oven at 120° C. to dry the wet cake. The resulting dry cake was milled to form the hybrid pigment.

Example 7

In this example, a hybrid pigment that includes soy protein and Acid Violet 17 was prepared. A solution was prepared by dissolving 5 g of sodium phosphate monobasic in 300 mL of water. To this solution, 100 g of soy protein isolate (Profam™ 648 soy protein isolate from Archer Daniels Midland Company) was suspended by means of mechanical stirring and heated to a temperature of 80° C. To the heated suspension, 2 g of Acid Violet 17 was added and the suspension was maintained at a temperature of 80° C. to 85° C. for 20 minutes. The solids were removed from the suspension via vacuum filtration and rinsed with water until the filtrate was free of dye. The resulting wet cake was transferred to an oven at 120° C. to dry the wet cake. The resulting dry cake was milled to form the hybrid pigment.

Example 8

In this example, a hybrid pigment that includes feather meal and Acid Red 52 was prepared. A solution was prepared by dissolving 3.5 g of potassium tripolyphosphate in 300 mL of water. To this solution, 125 g of feather meal (Feather Meal 80% from Boyer Valley Company) was suspended by means of mechanical stirring. The suspension was heated to a temperature of 80° C. and a sufficient amount of 20% aqueous sodium hydroxide was added to raise the pH of the suspension to 10. Next, 3 g of 50% hydrogen peroxide was added to the stirred suspension and the temperature maintained for 1 hour. After 1 hour, the pH of the suspension was adjusted to 4 by adding a sufficient amount of 70% phosphoric acid. Next, 2.5 g of Acid Red 52 was added. The temperature of the suspension was maintained at 80° C. for an additional 10 minutes. The solids were removed from the suspension via vacuum filtration and rinsed with water until the filtrate was free of dye. The resulting wet cake was transferred to an oven at 120° C. to dry the wet cake. The resulting dry cake was milled to form the hybrid pigment.

Example 9

In this example, a hybrid pigment that includes rice protein and Acid Red 92 and Acid Red 87 was prepared. A solution was prepared by dissolving 15 g of sodium phosphate monobasic in 200 mL of water and 100 mL of acetonitrile. To this solution, 100 g of rice protein (Oryzatein™ 80) was suspended by means of mechanical stirring. The suspension was heated to a temperature of 80° C. and 3 g of 50% hydrogen peroxide solution was added to the stirred suspension and the temperature maintained for 2.5 hours. The solids were then removed from the suspension via vacuum filtration and washed with water until the pH of the filtrate was neutral. The resulting wet cake was then resuspended in 300 mL of water by mechanical stirring and the pH of the suspension was adjusted to 4 by adding a sufficient amount of 70% phosphoric acid. The suspension was then heated to a temperature of 90° C. and 1.5 g of Acid Red 92 and 1.5 g of Acid Red 87 were added. After addition of the acid dyes, the temperature of the suspension was maintained at 90° C. for 30 minutes. The solids were removed from the suspension via vacuum filtration and the resulting wet cake was transferred to an oven at 120° C. to dry the wet cake. The resulting dry cake was milled to form the hybrid pigment.

Example 10

In this example, a hybrid pigment that includes rice protein and Acid Red 92 and Acid Red 87 was prepared. A solution was prepared by dissolving 15 g of sodium phosphate monobasic and 25 g of urea in 300 mL of water. To this solution, 100 g of rice protein (Oryzatein™ 80) was suspended by means of mechanical stirring. The suspension was heated to a temperature of 80° C. and 3 g of 50% hydrogen peroxide solution was added to the stirred suspension and the temperature maintained for 2.5 hours. The solids were then removed from the suspension via vacuum filtration and washed with water until the pH of the filtrate was neutral. The resulting wet cake was then resuspended in 300 mL of water by mechanical stirring and the pH of the suspension was adjusted to 4 by adding a sufficient amount of 70% phosphoric acid. The suspension was then heated to a temperature of 90° C. and 1.5 g of Acid Red 92 and 1.5 g of Acid Red 87 were added. After addition of the acid dyes, the temperature of the suspension was maintained at 90° C. for 30 minutes. The solids were removed from the suspension via vacuum filtration and the resulting wet cake was transferred to an oven at 120° C. to dry the wet cake. The resulting dry cake was milled to form the hybrid pigment.

Example 11

In this example, a hybrid pigment that includes defatted soy flour and Acid Red 92 was prepared. A suspension was prepared by mixing 75 g of defatted soy flour (Prolia™ 200/70 defatted soy flour from Cargill, Inc.) in 200 mL of water. The pH of the suspension was adjusted to 4 by adding a sufficient amount of 70% phosphoric acid. Next, 1.25 g of Acid Red 92 was added and the suspension was heated to 90° C. over a 30 minute period. The solids were removed from the suspension via vacuum filtration and the resulting wet cake was transferred to an oven at 120° C. to dry the wet cake. The resulting dry cake was milled to form the hybrid pigment.

Unless otherwise indicated herein, all sub-embodiments and optional embodiments are respective sub-embodiments and optional embodiments to all embodiments described herein. While the present disclosure has been illustrated by the description of embodiments thereof, and while the embodiments have been described in considerable detail, it is not the intention of the Applicant to restrict or in any way limit the scope of the appended claims to such detail. Additional advantages and modifications will readily appear to those skilled in the art. Therefore, the present disclosure, in its broader aspects, is not limited to the specific details, the representative compositions or methods and illustrative examples shown and described. Accordingly, departures may be made from such details without departing from the spirit or scope of Applicant's general disclosure herein.

What is claimed is:

1. A hybrid pigment comprising:
   from 90% to 99% by weight of a natural polyamide substrate; and
   from 1% to 10% by weight of an acid dye disposed on the natural polyamide substrate.

2. The hybrid pigment of claim 1, wherein the natural polyamide substrate comprises at least one of a plant-derived protein and an animal-derived protein.

3. The hybrid pigment of claim 2, wherein the plant-derived protein comprises at least one of rice protein, hydrolyzed rice protein, soy protein, hydrolyzed soy protein, defatted soy flour, pea protein, hydrolyzed pea protein, wheat protein, hydrolyzed wheat protein, fava bean protein, hydrolyzed fava bean protein, rapeseed protein, hydrolyzed rapeseed protein, hemp protein, hydrolyzed hemp protein, quinoa protein, and hydrolyzed quinoa protein.

4. The hybrid pigment of claim 2, wherein the animal-derived protein comprises at least one of whey protein, hydrolyzed whey protein, milk protein isolate, casein protein, hydrolyzed casein protein, egg protein, hydrolyzed egg protein, collagen protein, hydrolyzed collagen protein, keratin, feather meal, and fish meal.

5. The hybrid pigment of claim 1, wherein the acid dye is ionically bonded to the natural polyamide substrate.

6. The hybrid pigment of claim 1, wherein the acid dye comprises at least one of Acid Yellow 23, Acid Yellow 3, Acid Yellow 73, Acid Yellow 250, Acid Red 50, Acid Red 52, Acid Red 87, Acid Red 92, Acid Blue 9, Acid Blue 25, Acid Blue 45, Acid Red 73, Acid Green 25, Acid Violet 14, Acid Violet 43, D&C Red 40, and FD&C Green 3.

7. The hybrid pigment of claim 1, wherein the hybrid pigment has an average particle size of less than 30 µm.

8. The hybrid pigment of claim 1, wherein the hybrid pigment has an average particle size of 1 µm to 10 µm.

9. The hybrid pigment of claim 1, wherein the hybrid pigment is biodegradable, compostable, or both.

10. A method of making a hybrid pigment comprising:
    a) preparing a suspension comprising water and a natural polyamide substrate;
    b) heating the suspension with agitation;
    c) adding with agitation an acid dye to the suspension;
    d) separating solids from the suspension to form a wet cake;
    e) drying the wet cake to form a dry cake; and
    f) comminuting the dry cake to form the hybrid pigment.

11. The method of claim 10, further comprising:
    adjusting a pH of the suspension to a pH of 2.5 to 6.5 to form an acidic suspension prior to adding the acid dye.

12. The method of claim 10, further comprising:
    i) treating the suspension to remove at least a portion of soluble fractions from the natural polyamide substrate;
    ii) heating the suspension with agitation to a temperature of up to no more than 100° C.;
    iii) adjusting a pH of the suspension to a pH of 7.5 to 10 to form a basic suspension;
    iv) heating the basic suspension to a temperature of 70° C. to 100° C.; and
    v) adjusting a pH of the basic suspension to a pH of 2.5 to 6.5 to form an acidic suspension prior to adding the acid dye.

13. The method of claim 10, further comprising adding with agitation a flocculant to the suspension after adding the acid dye.

14. The method of claim 10, wherein the suspension further comprises at least one of a defoamer, a surfactant, and a stabilizer.

15. The method of claim 10, further comprising adding a bleaching agent to the suspension prior to adding the acid dye.

16. The method of claim 10, wherein the natural polyamide substrate is subjected to a bleaching treatment prior to preparing the suspension.

17. The method of claim 10, wherein the natural polyamide substrate comprises at least one of a plant-derived protein and an animal-derived protein.

18. The method of claim 17, wherein the plant-derived protein comprises at least one of rice protein, hydrolyzed rice protein, soy protein, hydrolyzed soy protein, defatted soy flour, pea protein, hydrolyzed pea protein, wheat protein, hydrolyzed wheat protein, fava bean protein, hydrolyzed fava bean protein, rapeseed protein, hydrolyzed rapeseed protein, hemp protein, hydrolyzed hemp protein, quinoa protein, and hydrolyzed quinoa protein.

19. The method of claim 17, wherein the animal-derived protein comprises at least one of whey protein, hydrolyzed whey protein, milk protein isolate, casein protein, hydrolyzed casein protein, egg protein, hydrolyzed egg protein, collagen protein, hydrolyzed collagen protein, keratin, feather meal, and fish meal.

20. The method of claim 10, wherein the acid dye comprises at least one of Acid Yellow 23, Acid Yellow 3, Acid Yellow 73, Acid Yellow 250, Acid Red 50, Acid Red 52, Acid Red 87, Acid Red 92, Acid Blue 9, Acid Blue 25, Acid Blue 45, Acid Red 73, Acid Green 25, Acid Violet 14, Acid Violet 43, D&C Red 40, and FD&C Green 3.

21. A cosmetic product comprising the hybrid pigment of claim 1.

22. A fire-retardant material comprising the hybrid pigment of claim 1.

23. A seed coating formulation comprising the hybrid pigment of claim 1.

24. A paint or coating comprising the hybrid pigment of claim 1.

25. A masterbatch colorant comprising the hybrid pigment of claim 1.

26. An ink or ink base for conventional offset, rotogravure, flexographic, screen, or digital printing comprising the hybrid pigment of claim 1.

27. A hybrid pigment comprising:
    a natural polyamide substrate; and
    an acid dye disposed on the natural polyamide substrate, wherein the hybrid pigment has an average particle size of less than 30 µm.

* * * * *